(No Model.) 10 Sheets—Sheet 2.
A. W. BROWNE.
DENTAL CHAIR.

No. 541,589. Patented June 25, 1895.

WITNESSES: INVENTOR

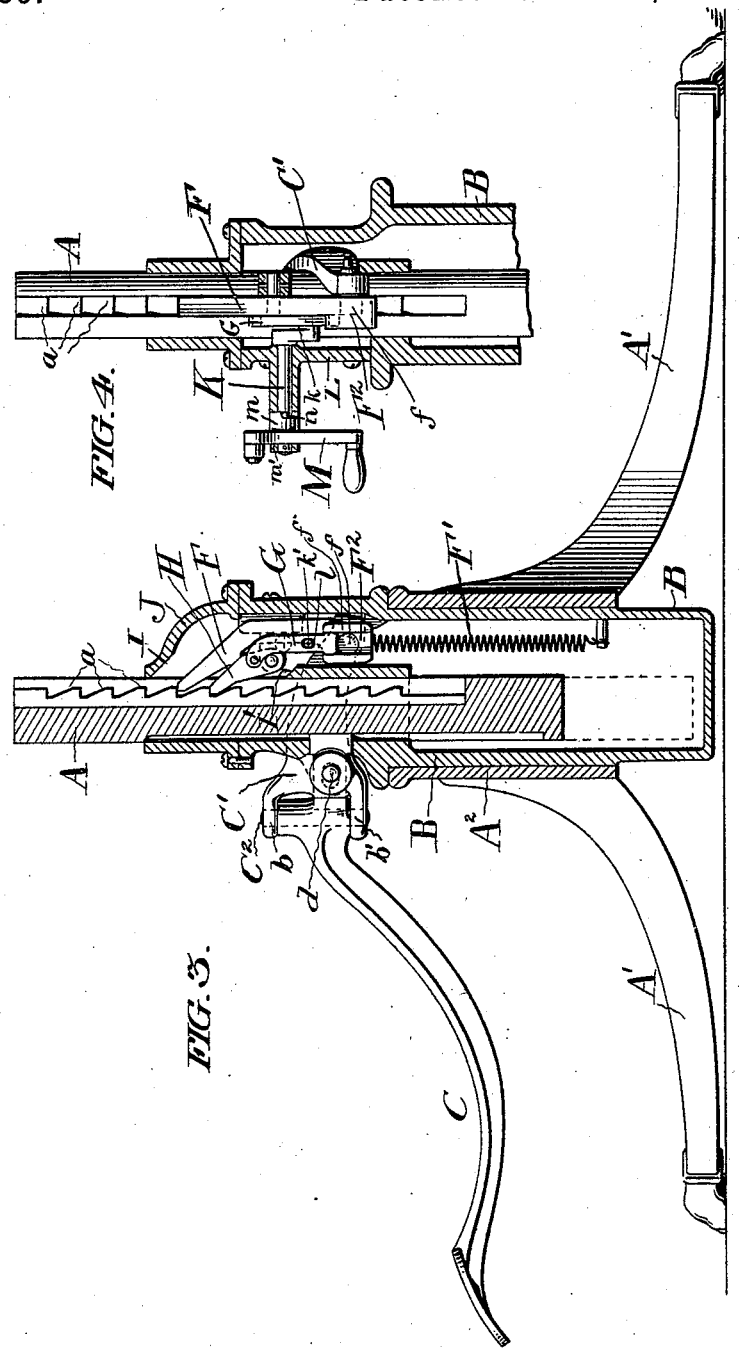

(No Model.)  10 Sheets—Sheet 4.

A. W. BROWNE.
DENTAL CHAIR.

No. 541,589.  Patented June 25, 1895.

SET FOR RAISING

WITNESSES:  INVENTOR (No Model.)

A. W. BROWNE.
DENTAL CHAIR.

No. 541,589.

10 Sheets—Sheet 8.

Patented June 25, 1895.

WITNESSES
Rob't E. Gordon
Edw. F. Simpson, Jr.

INVENTOR
A. W. Browne
By atty (No Model.)   
A. W. BROWNE.  
DENTAL CHAIR.  
10 Sheets—Sheet 9.
No. 541,589. Patented June 25, 1895.
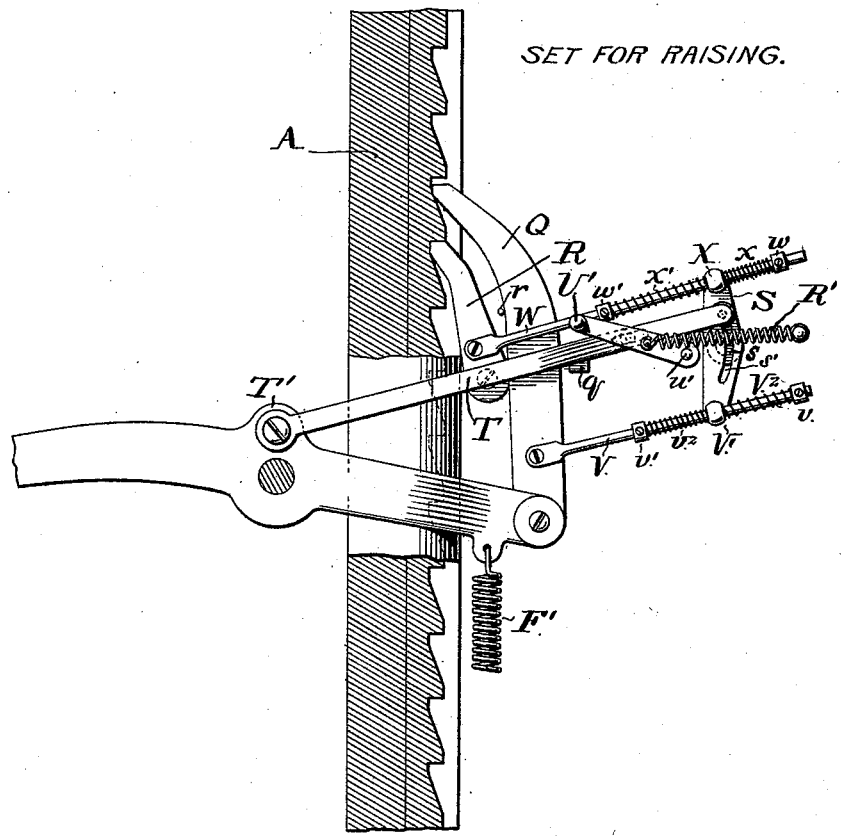

(No Model.) A. W. BROWNE. 10 Sheets—Sheet 10.
DENTAL CHAIR.
No. 541,589. Patented June 25, 1895.
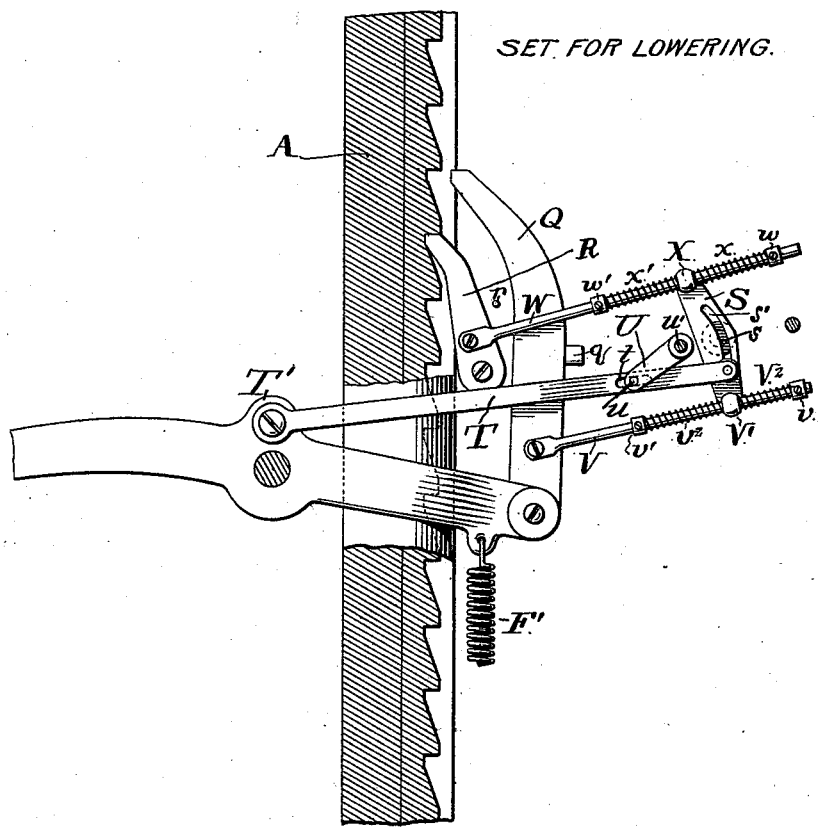
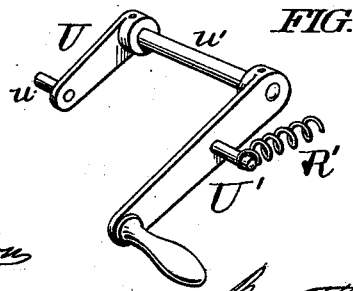

UNITED STATES PATENT OFFICE.

ARTHUR W. BROWNE, OF PRINCE'S BAY, NEW YORK, ASSIGNOR TO THE S. S. WHITE DENTAL MANUFACTURING COMPANY, OF PHILADELPHIA, PENNSYLVANIA.

DENTAL CHAIR.

SPECIFICATION forming part of Letters Patent No. 541,589, dated June 25, 1895.

Application filed April 2, 1894. Serial No. 506,025. (No model.)

*To all whom it may concern:*

Be it known that I, ARTHUR W. BROWNE, a citizen of the United States, residing at Prince's Bay, in the county of Richmond and State of New York, have invented certain new and useful Improvements in Dental Chairs; and I do hereby declare the following to be a full, clear, and exact description of the invention, such as will enable others skilled in the art to which it appertains to make and use the same.

My invention relates to certain improvements, as hereinafter claimed, in means for raising and lowering and maintaining in position vertically adjustable supports for the bodies of dental chairs by the actuations of a single lever.

Figure 1:
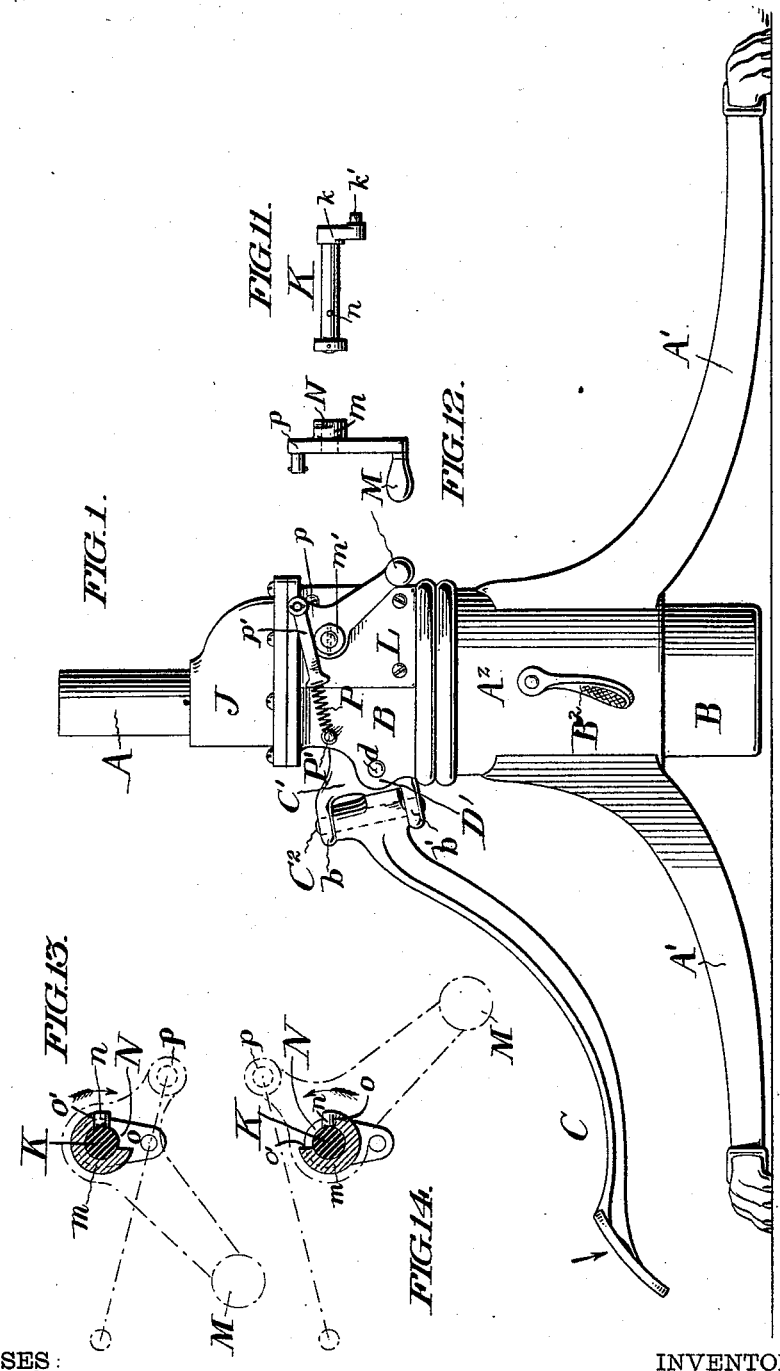
Figure 2:
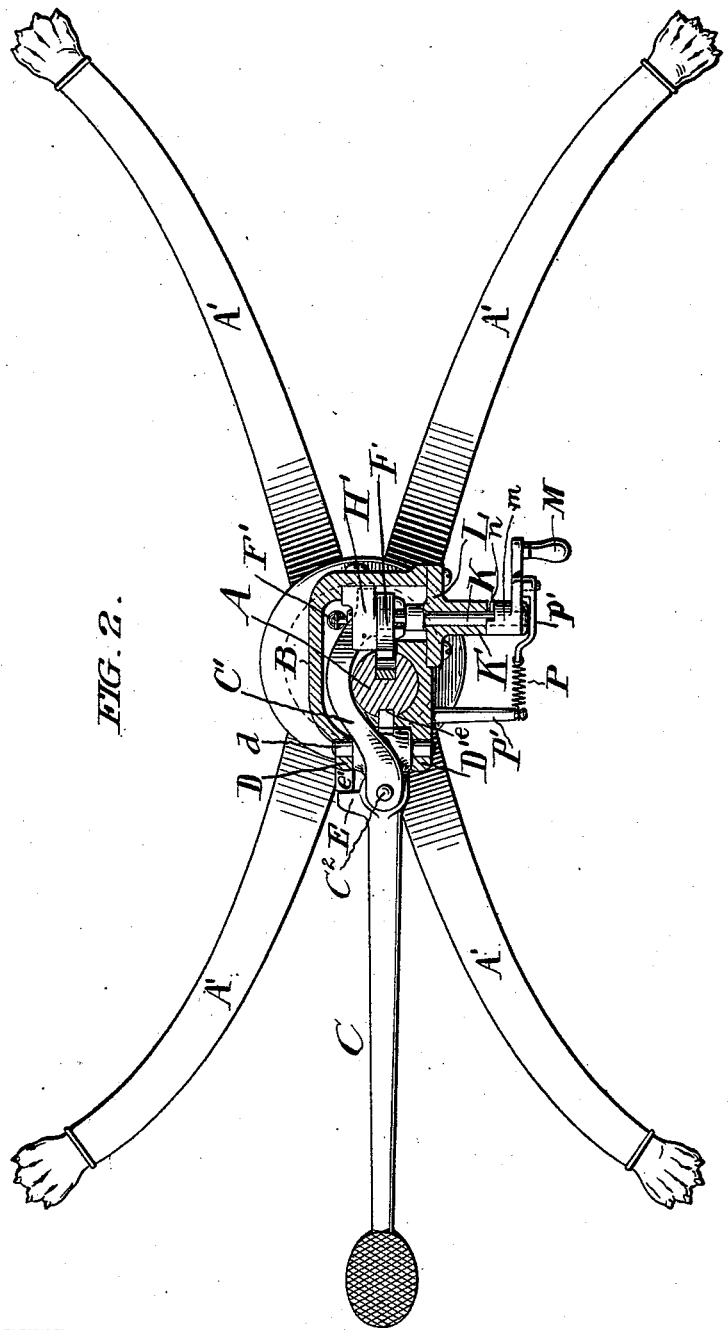
Figure 5:
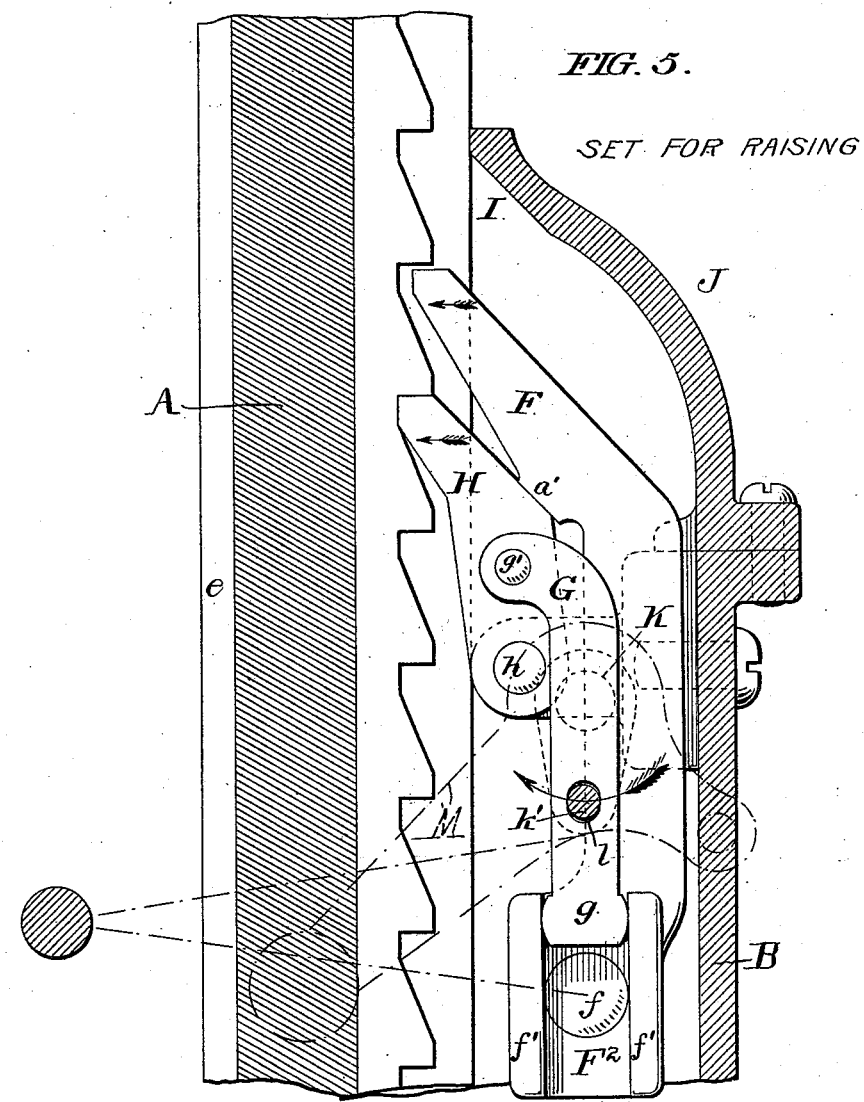
Figure 6:
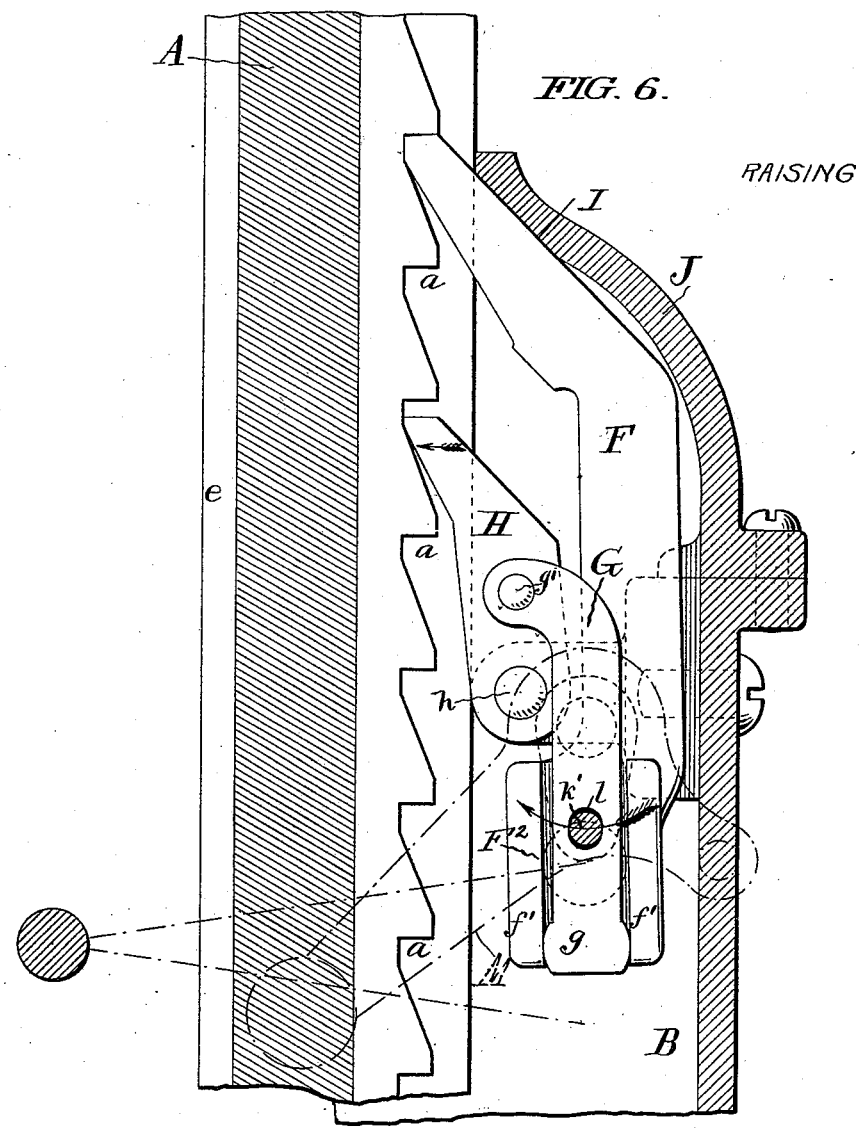
Figure 7:
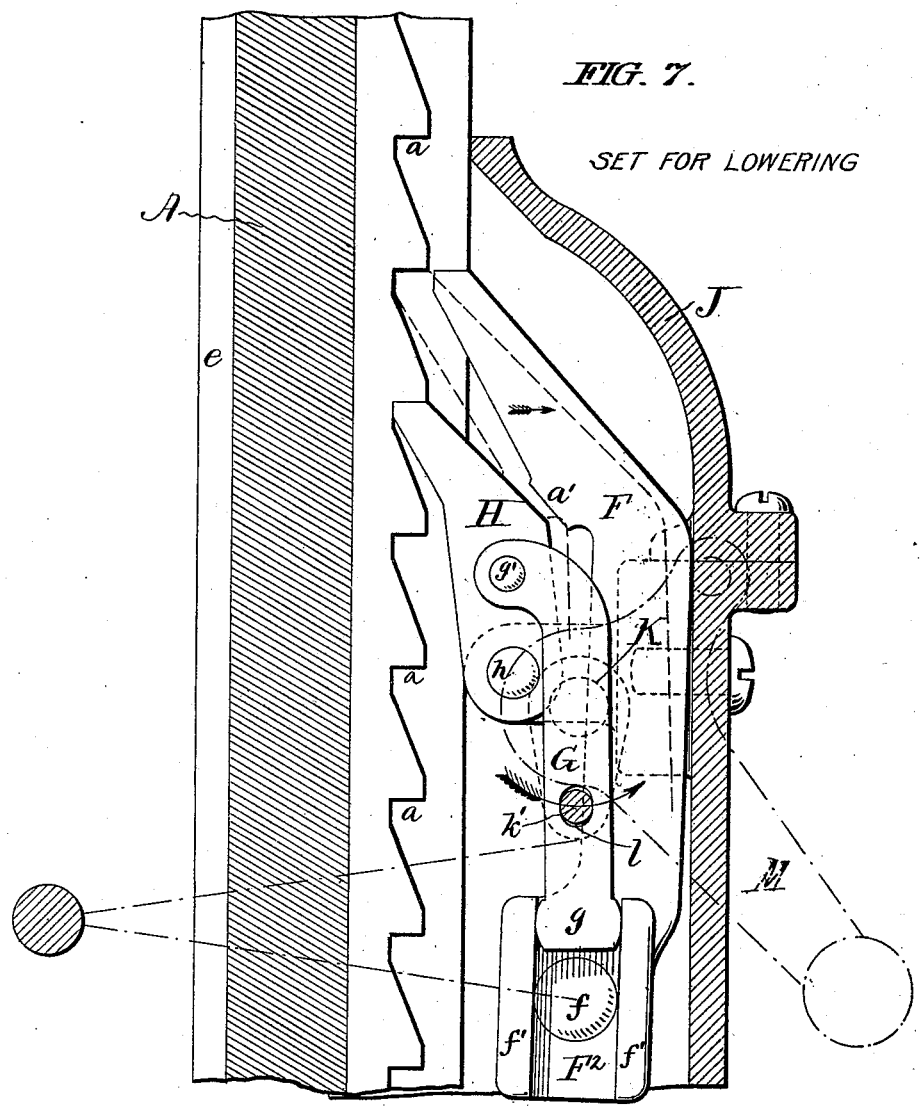
Figure 9:
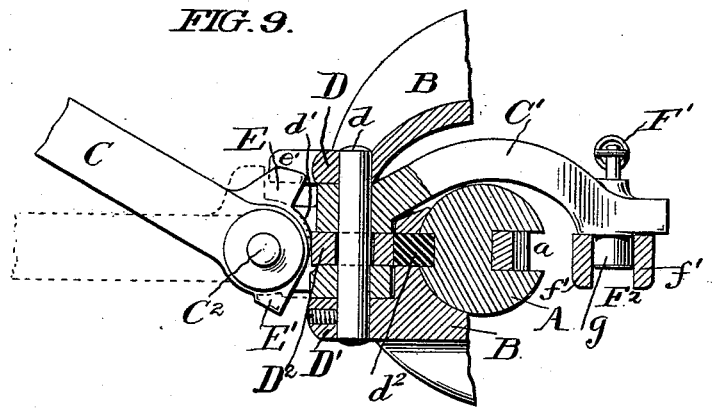
Figure 10:
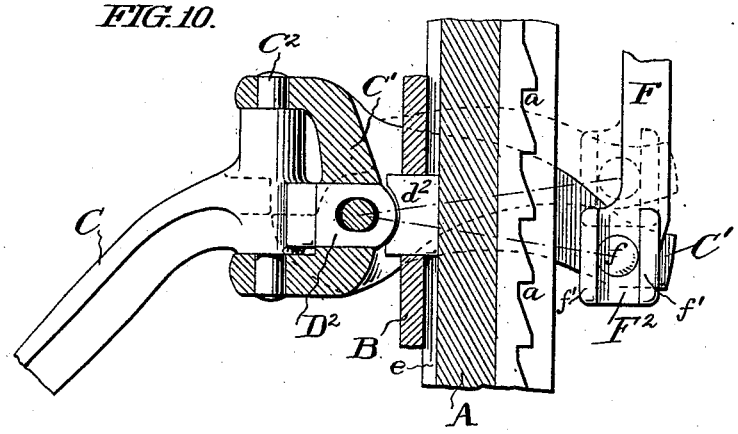

In the accompanying drawings, which show a suitable embodiment of my improvements with the chair body omitted, Figure 1 is a side elevation. Fig. 2 is a view partly in plan and partly in transverse section. Fig. 3 is a view partly in side elevation and partly in vertical section. Fig. 4 is a view partly in front elevation and partly in vertical section, with parts broken away and omitted. Fig. 5 is a view on an enlarged scale partly in side elevation and partly in vertical section, showing the mechanism in position for raising the chair body support, preparatory to operating the lever by which this mechanism is actuated; and Fig. 6 a similar view, with the mechanism in the position assumed by it when the lever has been actuated to raise the support. Fig. 7 is a view similar to Figs. 5 and 6 with the mechanism set for lowering the chair body support; and Fig. 8 a similar view, with the mechanism in the position assumed by it when the lever has been actuated preparatory to lowering the support. Fig. 9 is a view partly in plan and partly in horizontal section, with portions broken away, showing details of construction; and Fig. 10 a view partly in side elevation, and partly in vertical section. Figs. 11 and 12 show separately the controlling rock-shaft and its crank by which the operation of the mechanism for raising and lowering the chair body support is controlled. Fig. 13 is a side view partly diagrammatic and partly in section showing the controlling rock shaft and crank, with the rock shaft in the position to which it is adjusted when the chair body support is to be raised; and Fig. 14 a similar view with the rock shaft adjusted to the position to allow the chair body support to be lowered. Figs. 15, 16 and 17 show a modification of the raising, lowering, and upholding mechanism and its controlling mechanism, Fig. 15 showing in elevation the modified mechanism in position for raising the chair body support preparatory to operating the foot-actuated lever; and Fig. 16 showing the parts as set for lowering preparatory to operating the foot-actuated lever; while Fig. 17 is a view in perspective of the cranked rock shaft by means of which the controlling mechanism of the raising and lowering mechanism is actuated. In these views of the modified mechanism the support, carrier and various other parts are omitted.

A support A for a chair body is mounted so as to be vertically adjustable upon a suitable supporting base or pedestal which as shown consists of the legs A' and the hollow cylinder $A^2$ within and upon which cylinder is supported a carrier B in which the support A is adapted to move up and down, these parts being assembled substantially as in United States Letters Patent No. 197,441, dated November 20, 1877, and as explained in said patent a lever $B^2$ serves to actuate a clamp to lock the carrier B against turning in the pedestal, and the support is vertically grooved or recessed and provided in the recess with a row of teeth $a$ to be engaged by pawls as in turn to be explained.

A foot-actuated lever is made in two parts or sections—a main or outer part C and a short curved inner part C'—which are jointed together by a vertical pivot $C^2$ passing through lugs or forks $b\ b'$ of the inner section and through the inner end of the outer section of the lever near a horizontal pivot $d$ by which the lever is jointed by its inner section to the carrier B which is provided with lugs D D' for supporting this pivot. It will be seen that the lever (both sections thereof) is adapted to rock or swing vertically and that its long arm or main section may be swung horizontally to one side. The main arm of the elevating lever is provided at its inner end with a cam $d'$ which when this arm of the lever is moved sidewise into the position in which it is shown by full lines in Fig. 9, acts upon a clamping shoe made in two parts or sections $D^2\ d^2$, and thus clamps the chair body support A against lateral movement or vibration in any position to which it may be adjusted in its carrier. With the exception that the clamping shoe is made to engage a vertically extending groove or recess e in the support and thus lock the support against turning in its carrier, this clamping shoe, and the lever so far as described, are the same in construction and operation as set forth in my application, Serial No. 499,051, filed February 5, 1894, and I do not herein claim any improvement set forth in said application. When the clamping shoe is actuated the lever is locked against vertical movement by engagement of its lateral lug E between stops formed by projections e' (one only of which is shown) on the carrier lug D, and when the lever is in the position in which it is shown by dotted lines, Fig. 9, it is prevented from moving sidewise in one direction by its lateral projection E', substantially as in said application.

A pawl F is pivoted to the inner end of the sectional actuating lever and adapted for engagement with the teeth of the vertically adjustable support A, and the lever is overbalanced, a spring F' having connection at its opposite ends with the inner end of the lever and with the support carrier B, being provided which acts with a tendency to hold up the outer end of the lever and maintain it in this position when not actuated and restore it to such position after actuation. The lever-carried pawl is pivoted by its hub or bearing $F^2$ upon its journal f of the lever and the pawl hub is provided with vertically extending flanges or projections f' f' constituting a guideway sliding on the enlarged lower end or cross-head g of a pawl controlling link G which is adapted to rock slightly in this guideway as the actuating lever is operated, for a purpose in turn to be explained. An upholding or detent pawl H adapted to engage with the teeth of the vertically adjustable support, is carried by the support carrier, being pivoted at h to a bracket H secured to the support carrier. The link G is pivoted at its upper end to the upholding pawl H at g' above the pivot h of this pawl.

The throw or length of stroke of the lever pawl F is limited by stops at I I', shown as formed by the detachable cap J of the carrier B, with which the pawl comes in contact on its up stroke, and by an inward projection of the carrier with which the pawl hub comes in contact at the end of its lower stroke. See Fig. 3. For a purpose in turn to be made obvious the length of stroke of the lever pawl somewhat exceeds the pitch of the support teeth—that is, the distance between pawl-engaging shoulders of adjacent teeth is slightly shorter than the distance traveled by the pawl at each actuation thereof by the lever.

To adapt the one actuating lever to operate to either raise or lower the chair body support, pawl-controlling or adjusting mechanism in addition to the before described link G is provided as follows: A rock shaft K is mounted in a bearing K' provided in a detachable section L of the support carrier which section is screwed in place. A crank arm k at the inner end of this rock shaft is provided with a pin k' engaging a slot l in the pawl-controlling link G. An actuating lever or crank M is mounted loosely by a hub or short sleeve m on the rock shaft K which is provided with a stop pin n which projects into a recess or cut-away portion N of the rock shaft lever. Shoulders o o' at the opposite inner end of the hub m of the extremities of the recess N of the lever hub serve to engage this lever with the rock shaft by way of its stop pin n. A spring P has connection at one end with the support carrier by way of an arm P' secured to the carrier and at its opposite end with a short crank arm or extension p of the inner end of the lever or crank handle M, by way of a bent link p'. A washer or collar m' pinned to the rock shaft outside its lever hub detachably secures the lever in place. It will be seen that the tendency of the spring P is to hold the shouldered hub of the crank lever M in contact with the stop pin n on the rock shaft, whether this lever be adjusted to the position in which it is represented in Fig. 13 or to that in which it is shown in Fig. 14, and consequently the action of the spring P on the rock shaft tends to rock it and transmit the pull of this spring of the pawl-controlling mechanism to the link G by way of the crank pin k' of this controlling mechanism.

The operation of the raising and lowering mechanism is as follows: To raise the chair body support the lever or crank M of the pawl-controlling mechanism is turned into the position in which it is represented by dotted lines, Figs. 5, 6 and 13. With the main arm of the foot-actuated lever in its elevated position and the support sustained by the upholding pawl H, it will be seen that by the action of the spring P on the rock shaft K the crank pin k' engaging the slot of the link G is made to exert pressure upon the upholding pawl in a direction such as to hold it engaged with a tooth of the support, while at the same time the lower enlarged end or cross head of the link acting upon the guide way of the hub of the lever pawl above the pivot of this pawl exerts a pressure upon this pawl in a direction such as to cause its engagement with a tooth of the support when moved upward by the lever. Upon downward movement of the long arm of the lever the upholding pawl yields, the lower end of the link G rocking slightly in its guide way on the hub of the lever pawl as the upholding pawl yields. When the lever pawl has been lifted far enough to bring its axis of oscillation above the plane of contact of the link end or cross-head with its guide way on this pawl it will be seen that the spring P, acting through the rock shaft and its crank pin upon the link, tends to rock the lever pawl away from the toothed support; but as the weight of this support and the chair body (not shown) is at this time sustained by the lever pawl the force exerted by the link actuating spring P is inadequate to disengage the pawl from the support. The stop I which limits upward movement of the lever by acting upon its pawl, serves also to insure engagement of this pawl with the toothed support during the finishing portion of the upstroke of the lever, so that in event of failure of the link of the pawl controlling or adjusting mechanism to act properly, the support would be sustained by the lever pawl. The stroke of the lever pawl exceeding the pitch of the teeth of the support as before stated, it will be seen that by the time of completion of the upstroke of the lever pawl the upholding pawl is rocked by the action of the link of the pawl controlling or adjusting mechanism into position (see Fig. 6) for engagement with a tooth of the support just after the lever pawl starts on its downward stroke. When the upholding pawl takes the weight of the support upon downward movement of the lever pawl this latter pawl immediately rocks out of engagement with the support. During the concluding portion of the down stroke of the lever pawl after its axis of oscillation has been brought below the cross-head $g$ of the link of the pawl controlling mechanism, this mechanism acts with a tendency to engage the pawl with the support, it will be seen, and by continuing to actuate the raising and lowering lever the support may be elevated to the extent desired.

Figure 8:
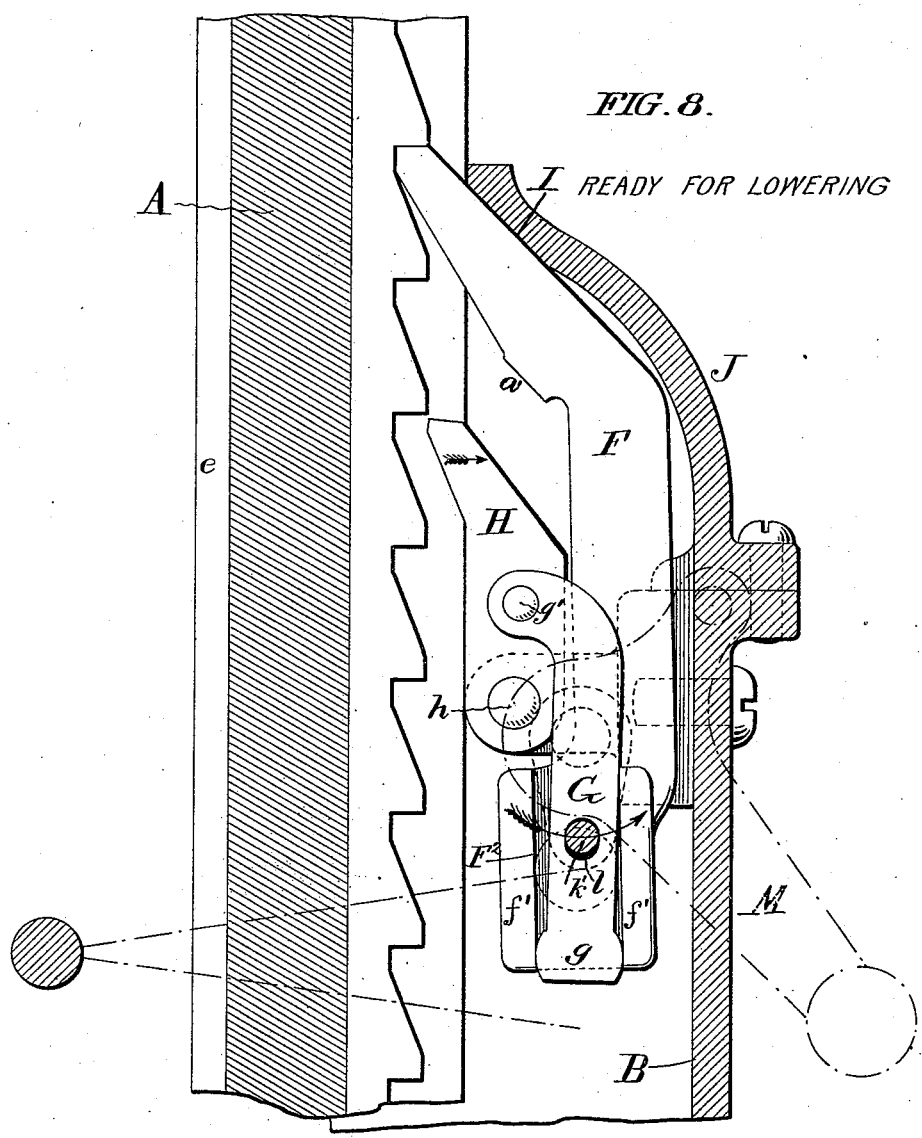

To lower the chair body support the lever M of the pawl controlling mechanism is adjusted to the position in which it is represented by Figs. 7, 8 and 14, so that the pull of the spring P upon the link G tends to move this link in the opposite direction to that in which it is moved by the action of the spring when the pawl-controlling mechanism is adjusted for raising the support as just above explained. Upon depressing the main arm of the foot-actuated lever, its pawl, being held out of engagement with the toothed support, ascends freely or clear of the support until the axis of oscillation of this pawl comes above the plane of contact of the link end or cross-head with its guide way on the pawl hub, when by the action of the link the lever pawl is swung into contact with the support and slightly before the time of completion of its upstroke engages a tooth thereof. During this upward movement of the lever pawl until after its engagement with a tooth of the support, the weight upon the upholding pawl prevents its disengagement from the support although the spring-actuated link G tends to trip this pawl at the time when this link is acting upon the lever pawl to engage it with the support. After engagement of the lever pawl with the toothed support the slight additional elevation of the support releases the upholding pawl from weight of the support and it flies out of engagement therewith. Upon the downward stroke of the lever pawl, during which sufficient pressure is exerted upon the foot rest of the elevating and lowering lever to prevent too rapid descent of the support, the upholding pawl remains out of contact with the support until slightly before the completion of the downward stroke when the upholding pawl engages a tooth of the support and arrests its descent, this engagement of the upholding pawl with the support being caused by the action of the lever pawl upon the upholding pawl by a shoulder $a'$ on the lever pawl bearing against the upholding pawl to force it into position before the support is released by the lever pawl; and, after this, just before the completion of its downward stroke, the lever pawl flies out of engagement with the support. The lowering operation may be repeated as often as required to adjust the support as desired.

Although the adjustable support A is shown as round and fitted so as to move endwise in a turning carrier, I do not wish to be understood as confining my improvements to such construction, as the support may be of any desired form, rectangular or of other polygonal shape in cross section; and any suitable equivalent be employed for the carrier shown, and the carrier instead of being adapted to turn horizontally may be stationary.

My improvements may otherwise be modified in various respects, while retaining essential features of my invention.

Figs. 15, 16 and 17, show modifications of my improvements. In these figures the pawl Q is pivoted at its heel to the inner end of the raising and lowering lever, and the upholding pawl R is, as before, pivotally connected with the support carrier which is not shown. Movements of the pawls away from the rack teeth of the support A are limited by stops $q$ and $r$.

The modified pawl-controlling mechanism is as follows: An arm or lever S is pivotally connected midway its length at $s$ with the support carrier (not shown) so as to be capable of rocking vertically. A curved slot $s'$ extending lengthwise of this rocking lever S is engaged by a pin or roller at one end of a link rod T which at its opposite end is pivoted to a projection or lug T' of the raising and lowering lever above the fulcrum pivot of this lever. The link rod has a slot at $t$ and this slot is engaged by the pin $u$ of a crank U at one end of a rock shaft $u'$ suitably mounted and provided with the actuating lever or crank U'. By turning the rock shaft by its actuating lever the link rod T may be caused to rock the rocking lever S and engage its slot at either end thereof, because of the engagement of the crank pin $u$ with the link slot $t$. A spring R' acting on the actuating lever U' serves to yieldingly hold the rock shaft in either of its two positions of adjustment. A rod V is pivoted at one end to the lever pawl Q near its pivotal connection with the raising and lowering lever, and engages and is adapted to slide in an eye or bearing V' at the lower end of the rocking lever S. Collars $v\,v'$ are adjustably secured to the slide rod V at opposite sides of and at suitable distances from the bearing V', and coiled springs $V^2\,v^2$ surrounding the slide rod bear at their opposite ends, respectively, against the bearing and the collars $v$ and $v'$. A rod W is pivoted to the upholding pawl R near its pivot and is adapted to engage and slide in a bearing X at the upper end of the slotted rocking lever S. This slide rod W, like the slide rod V is provided with adjustable collars $w\,w'$, and springs $x\,x'$ interposed between the collars and the slide rod bearing X.

To raise the toothed support, with the mechanism as modified, the rock shaft of the controlling mechanism is adjusted so as to cause the parts to occupy the positions in which they are represented by Fig. 15. Upon actuation of the lever pawl by depressing the outer end of the raising and lowering lever, this pawl is caused to engage a tooth of the support A and lift the support, releasing the upholding pawl from weight so that it may be moved away from the support by the action of the compressed slide rod spring $x$. As the support is being lifted the rocking lever S is rocked by means of the link rod T, the upper end of the rocking lever moving toward the support and its lower end away from it. Thus the springs $V^2$ and $x'$ of the respective slide rods are compressed. The action of the spring $x'$ upon the upholding pawl by way of the slide rod bears this pawl against the rack of the support and moves it into position for engaging a rack tooth slightly before the completion of the up stroke of the lever pawl. Shortly after the commencement of the upward movement of the outer end of the raising and lowering lever, the upholding pawl is engaged with a tooth of the support rack, and by the action of the spring $V^2$ upon the lever pawl through the slide rod V, this pawl is first thrown out of engagement with the support rack, and then, as the rocking lever is rocked by the link connecting it with the raising and lowering lever, the springs $v^2$ and $x$ are gradually compressed, so that the former acting through the slide rod V on the lever pawl moves it into contact with the support rack. At the completion of its down stroke this pawl is left in the position in which it is represented in Fig. 15 so that the lifting operation may be repeated.

To lower the toothed support the rock shaft of the pawl controlling mechanism is adjusted so as to cause the parts to occupy the positions in which they are represented in Fig. 16.

The operation of the modified mechanism in lowering the support will readily be understood from the above explanations and the description of the operation of the preferred mechanism.

I claim as my invention—

1. The combination of the vertically adjustable chair body support provided with the vertically extending groove or recess, the carrier for the support, the lever composed of jointed sections, pivoted to the carrier and provided with the cam at the inner end of its main section, and the sectional clamping shoe mounted to slide in the carrier and the inner section of the lever, actuated by said cam and engaging said groove or recess in the support when the lever is swung sidewise, substantially as set forth.

2. The combination of the vertically adjustable toothed support, its carrier, the raising and lowering lever jointed to the carrier, the lever pawl for engaging the toothed support, provided with the guide-way, the support-upholding pawl supported by the carrier, the controlling link pivoted to the upholding pawl at one end and at its opposite end engaged by the guide-way on the lever pawl, and means for maintaining a yielding pressure upon the controlling link to actuate the pawls, substantially as set forth.

3. The combination of the raising and lowering lever, its pawl provided with the guide-way, the carrier to which the lever is pivoted, provided with the stops acting upon said pawl and serving to limit the movements of the lever, the vertically adjustable toothed support mounted in the carrier and with which said pawl is adapted to be engaged, the support-upholding pawl supported by the carrier and against which the lever pawl is adapted to strike, the controlling link pivoted to the upholding pawl at one end and at its opposite end engaged by the guide-way on the lever pawl, and means for maintaining a yielding pressure upon the controlling link to actuate the pawls, substantially as set forth.

4. The combination of the vertically adjustable toothed support, its carrier, the raising and lowering lever jointed to the carrier, the lever pawl for engaging the toothed support, provided with the guide-way, the support-upholding pawl supported by the carrier, the controlling link pivoted to the upholding pawl at one end and at its opposite end engaged by the guide-way on the lever pawl, the rock shaft provided with a crank having a pin engaging a slot in said link, and supported by the carrier, the crank or lever loosely mounted on the rock shaft, provided with an extension or short crank, and adapted to be rocked on the rock shaft and be engaged therewith in two positions of adjustment, and the spring acting on the short crank or extension of the crank lever, substantially as set forth.

In testimony whereof I affix my signature in presence of two witnesses.

ARTHUR W. BROWNE.

Witnesses:
ELI T. STARR,
EDW. F. SIMPSON, Jr.

Correction in Letters Patent No. 541,589.

It is hereby certified that in Letters Patent No. 541,589, granted June 25, 1895, upon the application of Arthur W. Browne, of Prince's Bay, New York, for an improvement in "Dental Chairs," an error appears in the printed specification requiring correction as follows: Page 2, lines 79-80, the clause "inner end of the hub $m$ of the," should be stricken out and inserted before the word "rock," line 78 as now numbered, same page; and that the said Letters Patents should be read with this correction therein that the same may conform to the record of the case in the Patent Office.

Signed, countersigned, and sealed this 2d day of July, A. D. 1895.

[SEAL.]

JNO. M. REYNOLDS,
*Assistant Secretary of the Interior.*

Countersigned:
John S. Seymour,
*Commissioner of Patents.*